April 12, 1966  D. R. HENRY  3,245,171

FISH LURE

Filed July 15, 1964

INVENTOR.
DANA R. HENRY
BY Naylor & Neal
ATTORNEYS

United States Patent Office 3,245,171
Patented Apr. 12, 1966

3,245,171
FISH LURE
Dana R. Henry, 3533 Jordan Road, Oakland, Calif.
Filed July 15, 1964, Ser. No. 382,908
7 Claims. (Cl. 43—42.1)

The present invention relates to a fish luring and catching device and more particularly is directed to such a device employing an improved trolling lure.

In the prior art, various forms of artificial fish luring and catching devices have been provided. The most common of these devices may be broken into two general classes, namely: the spoon type; and the three dimensional fish simulating type. Devices of the spoon type have the common characteristic that they employ a light reflective spoon element which wiggles as it is trolled through the water and attracts the attention of fish. Devices of the three dimensional type are similar to those of the spoon type in that they generally wiggle as trolled through the water, thus also attracting the attention of fish. A disadvantage encountered in both the use of the spoon and three dimensional type devices is that the hooks thereof are prone to hang up on various underwater hazards, such as weeds and logs. Another and related disadvantage is that these hooks detract from the luring qualities of the devices.

It is, accordingly, a principal object of the present invention to provide a fish luring and catching device for trolling which avoids the disadvantages of prior devices, such as those enumerated above.

Another and related object of the invention is to provide a fish luring and catching device having a lure portion which expands to a position guarding and hiding the hook thereof upon trolling.

It is another object of the device to provide a fish lure which spins and flexes as it is trolled through the water to attract fish by both its movement and the variation of light reflection therefrom.

With respect to the latter object, it is another object of the invention to provide a fish lure with light reflective properties which are enticing to fish.

Yet another object is to provide a fish lure with anti-line-twisting characteristics.

In its broadest aspects, the fish luring and catching device of the present invention comprises a hook and a volute member secured to the hook so as to convolve therearound upon trolling. The volute member more specifically comprises a flexible substantially planar element secured to the hook so as to be upstream thereof at the commencement of trolling. Upon the commencement of trolling, the element is adapted to resiliently convolve into a substantially helical configuration surrounding the hook.

The foregoing and other objects of the invention and its specific structure and operation will become more apparent when viewed in light of the following detailed description and accompanying drawings, wherein.

Figures 1, 3:
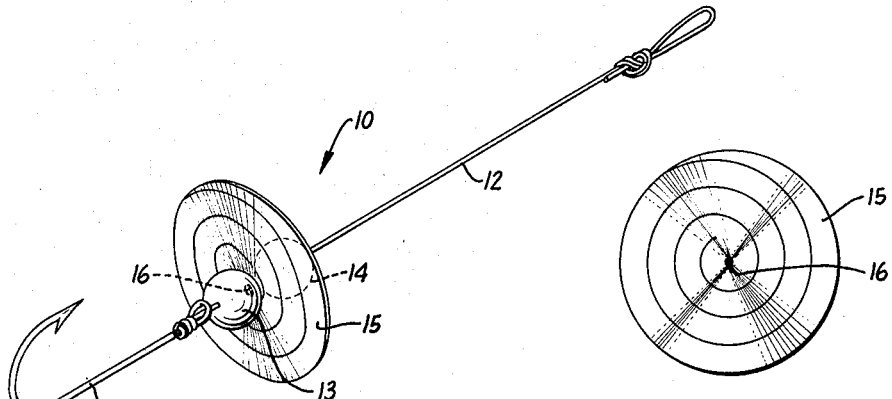
FIG. 1 is a perspective view of one embodiment of the inventive device when not in use.
FIG. 3 is an end view of the volute member when not in use with the hook removed therefrom.

Referring now to the drawings, the numeral 10 therein designates the fish luring and catching device in its entirety. The device includes several relatively conventional elements comprising: a hook 11; a leader 12 of catgut or the like tied to the hook; and a pair of beads 13 and 14 threaded onto the leader. In the preferred form of the invention illustrated, the beads 13 and 14 are fabricated of a translucent iridescent material enticing to fish.

The lure element to which the present invention is primarily directed comprises a volute member 15 having an opening 16 through the center thereof loosely threaded onto the leader 12 between the beads 13 and 14. Although the member is illustrated in its preferred form as being circular and having a spiral shaped slit therein, it is to be understood that the volute might take varying forms without departing from the invention. For example, the member might be polygonal in shape and the convolute slit therein might be angular rather than a smooth continuous curve.

Figure 2:
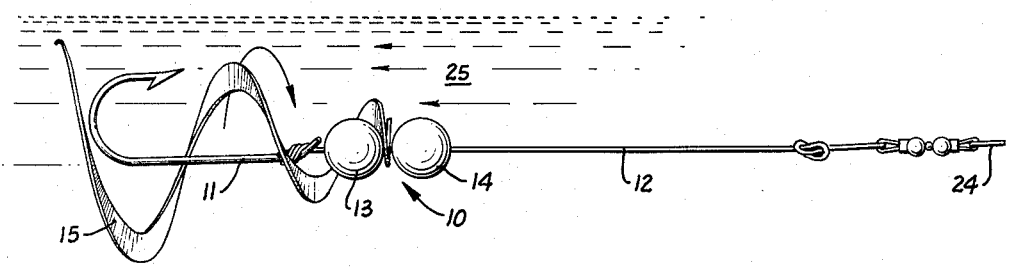
FIG. 2 is a side elevational view of the FIG. 1 embodiment of the device in use in a body of water.

The preferred form of the volute member 15 illustrated is fabricated of a flexible material capable of convolving from the relatively planar condition illustrated in FIGS. 1 and 3 to the helical form illustrated in FIG. 2 under the action of water during trolling. Sheets of thin resilient plastic or metal foil are particularly suitable for fabrication of the member 15, since they readily and resiliently convolve between the positions illustrated in FIGS. 1 and 3. In the preferred form, the member 15 also has light reflecting characteristics which are enticing to fish.

Figure 4:
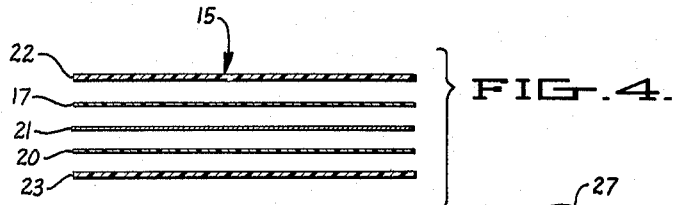
FIG. 4 is an exploded edge view of the preferred laminate material from which the volute member is fabricated.

The detailed structure of the preferred material from which the illustrated member 15 is fabricated is shown in FIG. 4. This material is laminated and comprises a pair of transparent plastic difraction gratings 17 and 20 aluminized by a film 21 therebetween; and a pair of protective transparent plastic films 22 and 23 covering the outer surfaces of the gratings 17 and 20. It is to be understood that FIG. 4 is an enlarged exploded view of the laminated material and that the material is actually very thin and flexible.

The use of material for the member 15 incorporating difraction gratings, as exemplified in FIG. 4, is particularly desirable since such gratings reflect white light in various colors of the spectrum. Thus, the image presented by such material is enticing to fish, since it simulates the appearance of the scales of other fish, such as minnow. It is noted that although the difraction grating in the illustrated member 15 is of a reflective type, the member could incorporate gratings of the transparent type, as they are also enticing to fish.

FIG. 2 illustrates the device 10 as it is being trolled through a body of water 25 by a conventional fishing line 24 secured to the leader 12. In this condition, the flow of water against the member 15 functions to convolve the member into a helical configuration surrounding the hook 11. It is noted that the member 15 is so dimensioned that the helix convolved therefrom is a diameter sufficient to extend loosely around the hook. Thus, the force of water against the member 15 during trolling functions to both convolve the helix and spin the helix around the hook 11.

Figure 5:
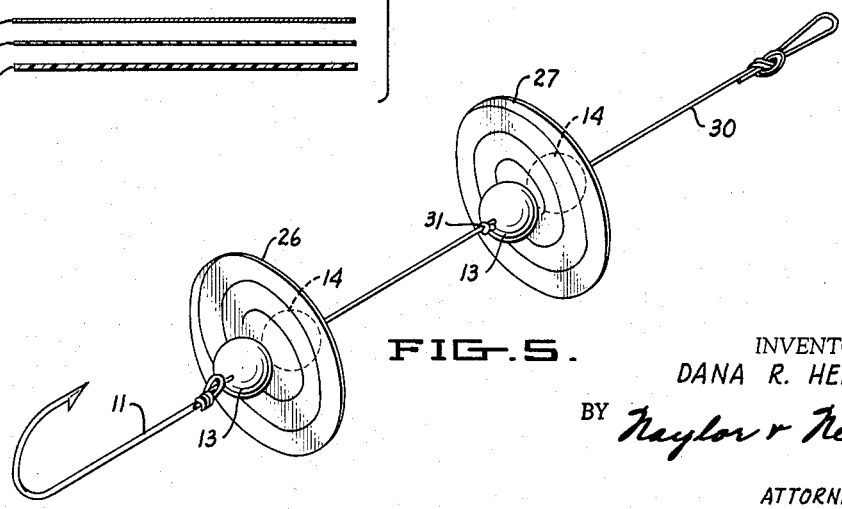
FIG. 5 is a side perspective view of an alternate embodiment of the device when not in use.

Referring now to FIG. 5, therein is illustrated an embodiment of the invention differing from that described with respect to FIGS. 1 to 3 primarily in that it incorporates a pair of volute members 26 and 27, rather than a single volute member 15. For purpose of illustration the members 26 and 27 have also been shown as differing from the member 15 in that they are formed of simple reflection material, rather than material incorporating difraction gratings. Elements in the FIG. 5 embodiment corresponding identically to those of the FIG. 1 to 3 embodiment are designated by like reference numerals.

The volute members 26 and 27 in the FIG. 5 embodiment are strung on a leader 30 corresponding substantially to the aforedescribed leader 12, which leader is in turn secured to a hook 11. Beads 13 and 14 are positioned on opposite sides of each of the members 26 and 27 to facilitate their positioning and free rotation on the leader 30. The bead 13 adjacent the member 27 is held against sliding movement toward the member 26 by a knot 31 formed in the leader 30. The knot 31 is so located as to space the member 27 from the member 26 by a distance sufficient that the respective members will not entangle upon expansion during trolling.

Attention is now directed to the orientation of the spiral shaped slits in the members 26 and 27. Specifically, as mounted on the leader 30 the slits in the members 26 and 27 convolve in opposite directions. Thus, when the FIG. 5 embodiment is trolled through the water, similar to the illustration of FIG. 2, the members 26 and 27 rotate in opposite directions. This characteristic is particularly advantageous since it performs an anti-twisting function during trolling.

In operation of the FIG. 5 embodiment during trolling, both the members 26 and 27 expand to a condition substantially corresponding to that of the member 15 illustrated in FIG. 2. Thus, the member 26 functions to hide and shield the hook 11, while at the same time enticing fish; and the member 27 performs an anti-twisting and fish enticing function.

To conclude, from the foregoing detailed description it is believed apparent that the present invention enables the accomplishment of the objects initially set forth herein. In particular, it can be seen that when convolved into helical configuration during trolling, the members 15 and 26 shield the hook 11 so as to both hide it from the view of the fish and prevent its entanglement in weeds and other underwater objects. Additionally, in the spinning helical condition, the members 15, 26 and 27 present an image especially enticing to fish. This image is enhanced by the continuous flexing of the members during trolling due to their resiliency. It is to be understood, however, that the invention is not intended to be limited to the specific embodiments illustrated and described, but rather is defined by the following claims.

I claim:
1. A fish luring and catching device, comprising:
    (a) a hook having a free end portion with a barb thereon; and
    (b) a resilient substantially planar volute member defined by a disc having a volute slit therethrough extending from a mid-portion thereof to and through an edge portion thereof, said member being secured at its mid-portion adjacent to said hook so as to be upstream thereof at the commencement of trolling of said device and, upon trolling thereof, being adapted to resiliently convolve under the force of fluid thereagainst into a substantially helical configuration surrounding the free end portion of said hook.
2. A device according to claim 1 wherein said mid-portion of said member is pivotally secured adjacent to said hook to spin around said hook upon trolling.
3. A device according to claim 1 wherein said member is provided with a light reflecting surface.
4. A device according to claim 3 wherein said surface comprises diffraction grating means.
5. A fish luring and catching device, comprising:
    (a) a hook having a free end portion with a barb thereon;
    (b) a leader secured to said hook;
    (c) a first resilient substantially planar volute member defined by a disc having a volute slit therethrough extending from a mid-portion thereof to and through an edge portion thereof, said member being rotatably secured at its mid-portion in substantially normal relationship to said leader at a position adjacent to said hook at the commencement of trolling of said device and, upon the trolling thereof, being adapted to spin in one direction and resiliently convolve under the force of fluid there against into a substantial helical configuration surrounding the free end portion of said hook; and
    (d) a second resilient substantially planar volute member defined by a disc having a volute slit therethrough extending from a mid-portion thereof to and through an edge portion thereof, said member being rotatably secured at its mid-portion in substantially normal relationship to said leader at a position spaced from said first member at the commencement of trolling of said device and, upon the trolling thereof, being adapted to spin in a direction opposite to that of said first member and resiliently convolve under the force of fluid thereagainst into a substantially helical configuration.
6. A device according to claim 5 wherein said first and second members are spaced apart on said leader sufficiently to prevent their entanglement upon the trolling of said device.
7. In combination:
    (a) fish catching means comprising a hook and a leader secured to said hook; and
    (b) fish luring means comprising a resilient substantially planar volute member defined by a disc having a volute slit therethrough extending from a mid-portion thereof to an edge portion thereof;
        (1) said member having the mid-portion thereof pivotally secured to said fish catching means to enable said member to freely spin as a unit about the fish catching means when said fish catching means is drawn through the water;
        (2) said member being adapted to resiliently convolve into a substantially helical configuration in surrounding relation to said fish catching means when said fish catching means is drawn through the water; and
        (3) said member being adapted to return to its substantially planar form in substantially normal relationship to said leader and to cease its spinning movement as a result of the cessation of the drawing of said fish catching means through the water.

References Cited by the Examiner

UNITED STATES PATENTS

| 1,617,318 | 2/1927 | Brown | 43—42.2 |
| 2,493,431 | 1/1950 | Wold | 43—42.2 |
| 2,519,338 | 8/1950 | Arnold | 43—42.29 |
| 2,610,429 | 9/1952 | Thomas | 43—42.2 X |
| 3,054,209 | 9/1962 | Wiley | 43—42.02 |
| 3,122,853 | 3/1964 | Koonz et al. | 43—42.24 |
| 3,158,952 | 12/1964 | Creme | 43—42.02 X |

FOREIGN PATENTS 281,100   12/1927   Great Britain.

SAMUEL KOREN, *Primary Examiner.*

ABRAHAM G. STONE, *Examiner.*

W. H. CAMP, *Assistant Examiner.*